(12) United States Patent  
Engesser et al.

(10) Patent No.: US 8,007,177 B2
(45) Date of Patent: Aug. 30, 2011

(54) FLUID DYNAMIC BEARING SYSTEM

(75) Inventors: Martin Engesser, Donaueschingen (DE); Stefan Schwamberger, Lohsa Ot., Hermsdorf (DE)

(73) Assignee: Minebea Co., Ltd., Nagano-ken (JP)

( * ) Notice: Subject to any disclaimer, the term of this patent is extended or adjusted under 35 U.S.C. 154(b) by 590 days.

(21) Appl. No.: 12/148,183

(22) Filed: Apr. 17, 2008

(65) Prior Publication Data

US 2008/0267544 A1 Oct. 30, 2008

(30) Foreign Application Priority Data

Apr. 26, 2007 (DE) .......................... 10 2007 019 642

(51) Int. Cl.
*F16C 32/06* (2006.01)
*F16C 17/10* (2006.01)

(52) U.S. Cl. ........ 384/114; 384/107; 384/123; 384/276; 310/90

(58) Field of Classification Search ................. 384/100, 384/107, 112, 114–115, 123, 279, 276, 121; 310/90
See application file for complete search history.

(56) References Cited

U.S. PATENT DOCUMENTS

| 3,471,205 | A  | * | 10/1969 | Farron et al. ................ 384/107 |
| 3,544,179 | A  |   | 12/1970 | De Leu |
| 5,834,870 | A  | * | 11/1998 | Tokushima et al. ............ 310/90 |
| 5,885,005 | A  |   | 3/1999  | Nakano |
| 6,505,968 | B1 | * | 1/2003  | Fleury et al. .................. 384/100 |
| 6,805,489 | B2 | * | 10/2004 | Nakagawa et al. ............ 384/114 |
| 6,929,402 | B1 |   | 8/2005  | Titus |
| 7,077,572 | B2 | * | 7/2006  | Horng et al. .................. 384/114 |
| 2001/0026652 | A1 | * | 10/2001 | Takahashi .................. 384/107 |
| 2005/0084189 | A1 | * | 4/2005  | Oelsch ........................ 384/107 |
| 2006/0250040 | A1 |   | 11/2006 | Engesser |
| 2007/0024136 | A1 | * | 2/2007  | Saito et al. .................. 310/90 |
| 2007/0110348 | A1 | * | 5/2007  | Obara ........................ 384/107 |
| 2007/0177832 | A1 | * | 8/2007  | Gotoh et al. ................. 384/107 |
| 2007/0206889 | A1 | * | 9/2007  | Obara et al. ................. 384/100 |

FOREIGN PATENT DOCUMENTS

| CH | 177685 | 8/1935 |
| DE | 2435261 | 2/1976 |
| DE | 102004045629 | 4/2006 |
| DE | 102004048537 | 4/2006 |
| DE | 102005021123 | 11/2006 |
| JP | 2000175401 A * | 6/2000 |
| JP | 2003120662 A * | 4/2003 |

* cited by examiner

*Primary Examiner* — Marcus Charles
(74) *Attorney, Agent, or Firm* — Cooper & Dunham LLP

(57) ABSTRACT

A fluid dynamic bearing system that has a first bearing part and a second bearing part that is rotatable with respect to the first bearing part, both of which form a bearing gap filled with a bearing fluid between opposing bearing surfaces.

14 Claims, 5 Drawing Sheets

FLUID DYNAMIC BEARING SYSTEM

BACKGROUND OF THE INVENTION

The invention relates to a fluid dynamic bearing system, particularly a small-scale fluid dynamic bearing system as employed, for example, in electric motors.

PRIOR ART

The ongoing miniaturization in the construction of electric motors is giving rise to new design problems, particularly with regard to the design and construction of small drive motors and suitable bearing systems. Roller bearing systems are still being used for the rotatable support of electric motors. However, due to their small-scale construction and greater precision, fluid dynamic bearing systems are becoming increasingly accepted.

One disadvantage of fluid dynamic bearing systems compared to roller bearings is presented by their sealing system, since a liquid lubricant (bearing fluid) is generally used. Miniaturization of the bearing in particular means that their sealing arrangements have to be adapted accordingly. It is important that the bearing fluid be given unimpeded access from the fluid supply to the actual bearing regions. On the other hand, it is necessary to ensure that no fluid escapes from the bearing. In view of the high build-up of pressure, this is particularly problematic for bearings that have several sealing openings.

Another disadvantage of fluid bearings compared to roller bearings is that, due to their particular bearing patterns, they can often only be operated in one direction of rotation. This restricts their possible range of applications and requires installation in the correct position. Although surface patterns for fluid dynamic bearings that may be operated in both directions are known, the utilization of these patterns in completed bearing systems without the means of re-lubrication has not been feasible to date since it has not been possible to retain the bearing fluid in the bearing. A dynamic seal, as described, for example, in DE 10 2004 045 629 A1 cannot be used since bearings which operate in both directions of rotation do not develop a directed pumping effect or the pumping effect differs according to the direction of rotation.

SUMMARY OF THE INVENTION

It is the object of the invention to create a fluid dynamic bearing that is suitable for both directions of rotation and, in a small-scale construction, shows high reliability in terms of tightness, capacity to take up bearing loads and stiffness.

This object has been achieved according to the invention by the characteristics outlined in claim 1

Preferred embodiments and other beneficial characteristics of the invention are cited in the subordinate claims.

In the conventional manner, the fluid dynamic bearing system comprises a first bearing part and a second bearing part that is rotatable with respect to the first part, the bearing parts forming a bearing gap filled with bearing fluid between opposing bearing surfaces. The bearing gap has two open ends that are each sealed against the environment by means of sealing zones. Bearing patterns used to generate hydrodynamic pressure within the bearing gap are provided on at least two spatially separated bearing surfaces.

According to the invention, the bearing system is designed as a segment step bearing suited for changed directions of rotation, the ends of the sealing zones open to the environment being disposed on a smaller radial diameter than the bearing gap. In this way the bearing fluid is held in the bearing by a centrifugal force, since on rotation of the bearing, the bearing fluid is pressed towards the outside and not towards the openings of the bearing gap or the sealing zones respectively. However, the pressure in the bearing gap generated by centrifugal forces is less than the pressure that can be generated by the bearing patterns that exert a pumping effect on the bearing fluid. The pumping effect of the bearing patterns must therefore be adjusted such that it is not greater in the direction of the open ends of the bearing gap or the sealing zone respectively than the centrifugal force acting on the bearing fluid. Depending on the manufacturing tolerances of the bearing, the column of fluid within the bearing gap and the sealing zones is then established in operation such that there is no flow of fluid between the two open sides of the bearing.

In a preferred embodiment of the invention, the first bearing part comprises a first bearing ring and a first and third bearing plate connected to the first bearing ring, the first and third bearing plate being disposed at a mutual spacing on the first bearing ring, so that an annular space is formed between the first bearing ring and the first and third bearing plate. The second bearing part further comprises a second bearing ring and a second bearing plate fixedly connected to the second bearing ring, the second bearing plate being accommodated in the annular space rotatable about a rotational axis. The bearing gap extends between the opposing surfaces of the first bearing ring, the first and third bearing plate and the second bearing plate, the bearing patterns used to generate hydrodynamic pressure being disposed on selected opposing bearing surfaces of the first bearing ring, the first and third bearing plate or the second bearing plate. This design makes possible a very simple construction of the bearing, which, in its simplest form, consists merely of five components, i.e. two bearing rings and three bearing plates. Thanks also to the central bore, this design makes it possible for the bearing system to be used as a direct substitute for an equivalent roller bearing.

The two sealing zones that are provided adjoining the ends of the bearing gap are disposed in the first embodiment of the invention in an axial direction between opposing surfaces of the first and third bearing plate and of the second bearing ring. In another embodiment the sealing zones may be disposed in a radial direction between opposing surfaces of the first and third bearing plate and each of the cover plates covering the first and third bearing plate. The sealing zones preferably take the form of capillary gap seals, either as straight gap seals or as tapered gap seals of a known art. At the same time, the sealing zones form a reservoir for the bearing fluid. As a further safety measure against any bearing fluid leaking out of the bearing gap, the open ends of the sealing zones may be covered by covering caps. However, the sealing zones should not be fully closed.

In its preferred construction, the bearing system comprises two axial bearings that are formed by the radially extending bearing surfaces facing each other of the second bearing plate and of the first and third bearing plate. These axial bearings have bearing patterns taking the form of a plurality of radially extending grooves in the end faces of the second bearing plate and wedge surfaces adjoining the grooves, as are characteristic for segment step bearings.

A radial bearing is further provided that is formed by the axially extending bearing surfaces facing each other of the second bearing plate and of the first bearing ring. The radial bearing also comprises bearing patterns taking the form of a plurality of axially extending grooves on the outside circumference of the second bearing plate or wedge surfaces adjoining the grooves, as are characteristic for segment step bearings.

The number of grooves or wedge surfaces respectively of the radial bearing may be the same as or different to the number of grooves or wedge surfaces respectively of the two axial bearings. The number of grooves and wedge surfaces of the radial bearing and of the axial bearings may be individually determined according to the desired pumping effect of the bearing patterns.

The grooves and wedge surfaces of the radial bearing also need not extend at the same angle as the grooves and wedge surfaces of the axial bearings, but rather they may be offset to the grooves and wedge surfaces of the axial bearings.

Depending on the design of the bearing, the radial bearing may either be disposed radially inwards of the axial bearings, i.e. the largest radial diameter of the radial bearing is less than or equal to the smallest radial diameter of the axial bearings. The radial bearing may, however, be disposed radially outwards of the axial bearings. The fluid dynamic bearing system according to the invention can preferably form a part of an electric motor.

The invention is described in more detail below on the basis of several embodiments with reference to the drawings. Further characteristics and advantages of the invention can be derived from the drawings and their description.

DESCRIPTION OF PREFERRED EMBODIMENTS OF THE INVENTION

A first embodiment of the bearing system according to the invention is illustrated in FIGS. 1 to 4.

Figure 1:
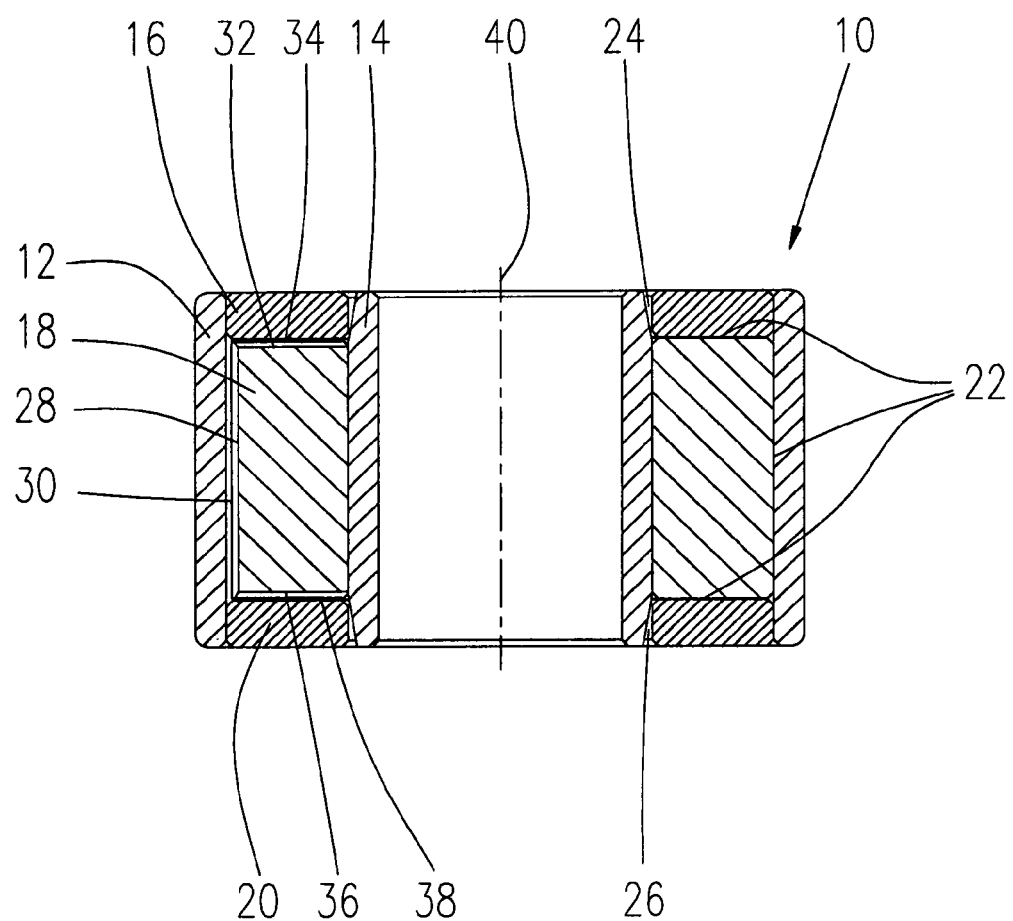
FIG. 1 shows a section through a first embodiment of a fluid dynamic bearing system according to the invention.

FIG. 1 shows a section through the bearing that is primarily characterized by its simple construction. The bearing 10 comprises a first bearing ring 12, which here forms the outer boundary of the bearing, as well as a second bearing ring 14, which here forms the inner boundary of the bearing in the direction of a central bore. The first bearing ring 12, which is substantially cylindrical in shape, is connected to a first, annular bearing plate 16 that is disposed at its inside circumference. At an axial spacing to the first bearing plate 16, a third bearing plate 20 is disposed on the first bearing ring 12, the third bearing plate being likewise annular in shape and fixed at the inside circumference of the bearing ring 12. An annular space is formed between the inner surface of the first bearing ring 12 and the inner surfaces of the two bearing plates 16 and 20. The second, substantially cylindrical bearing ring 14 is connected at its outside circumference to a second annular bearing plate. The second bearing plate 18 is accommodated in the annular space and, together with the second bearing ring 14, is rotatable about a rotational axis 40 with respect to the first bearing ring 12 and the two bearing plates 16 and 20. A bearing gap 22 extends between the rotating components facing each other, to be precise between the facing surfaces of the first bearing plate 16 and the second bearing plate 18, the facing surfaces of the first bearing ring 12 and the second bearing plate 18 as well as the facing surfaces of the third bearing ring 20 and of the second bearing ring 18. Sealing zones 24 and 26 adjoin the two open ends of the bearing gap 22, the sealing zones being disposed radially between the opposing surfaces of the second bearing ring 14 and of the first or the second bearing plate 16 and 20 respectively. These sealing zones 24, 26 take the form of tapered capillary seals.

Figure 2:
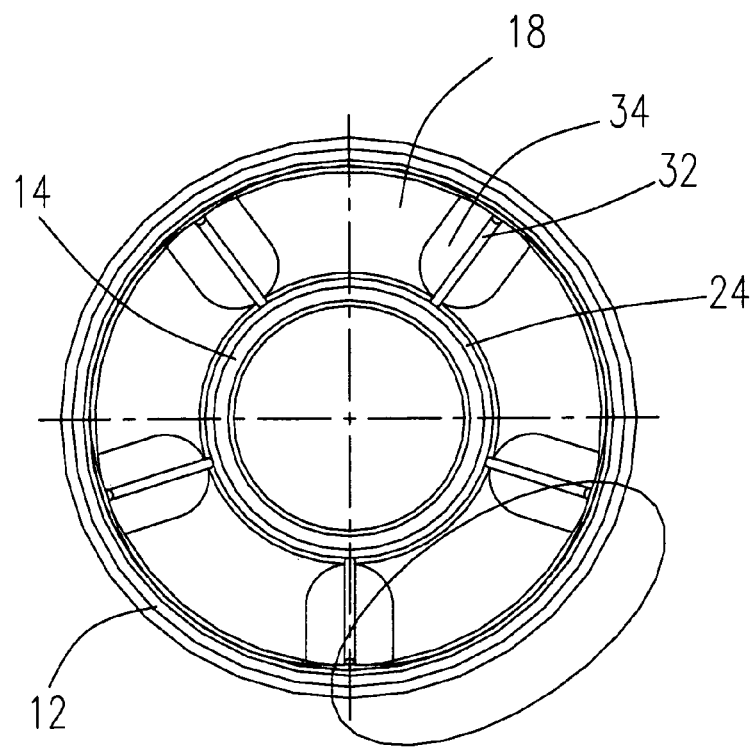
FIG. 2 shows a view from above of the bearing system of FIG. 1, wherein the top bearing plate has been removed.
Figure 3:
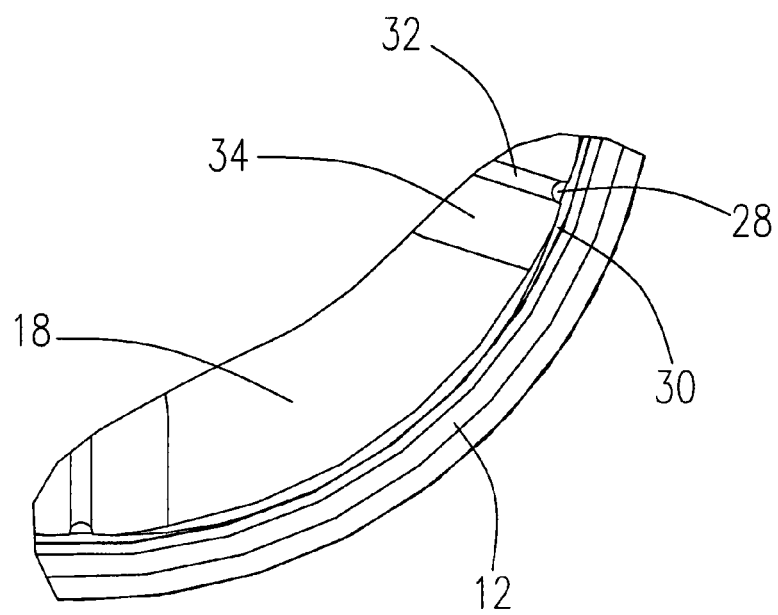
FIG. 3 shows an enlarged detail of the bearing patterns of FIG. 2.
Figure 4:
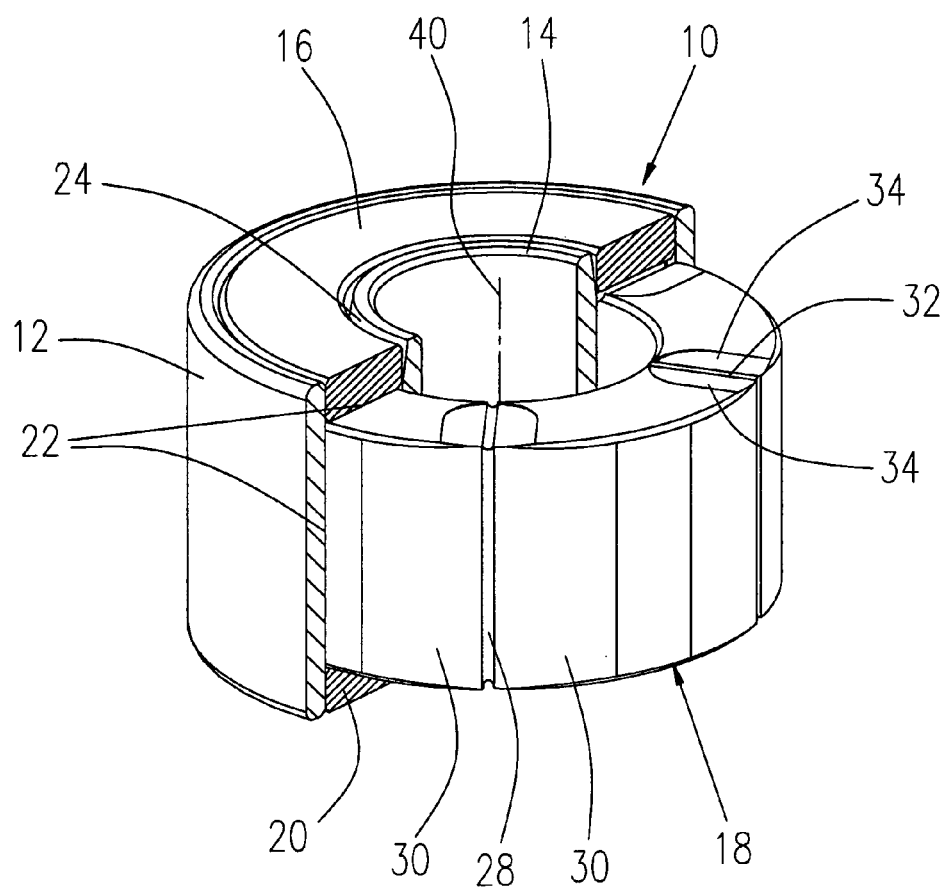
FIG. 4 shows a perspective view of the bearing system of FIGS. 1 to 3.

As can be particularly seen from FIGS. 2 to 4, the bearing system comprises two axial bearings and one radial bearing that are designed as segment step bearings. FIG. 2 shows the upper axial bearing that is formed between the first bearing plate 16 and the second bearing plate 18. The bearing patterns are preferably provided on the second bearing plate.

As can best be seen from FIG. 4, the radial bearing patterns consist of grooves 28 that are distributed over the circumference of the second bearing plate 18 and extend axially, the grooves being bounded on both sides by radially extending wedge surfaces 30. The wedge surfaces 30 are disposed on both sides of the grooves 28. The circumferential surface of the second bearing plate 18 is thus divided into segments, each consisting of a groove 28 and two adjacent wedge surfaces 30. Through the sloping wedge faces, a pumping effect is produced on the bearing fluid according to the direction of rotation when the bearing plate 18 rotates, thus generating a flow of bearing fluid in the bearing gap 22 and a build up of pressure, and giving the radial bearing its load-carrying capacity.

The two axial bearings also consist of appropriate segment step bearings. The upper axial bearing consists of grooves 32 provided in the end face of the second bearing plate 18, the grooves being bounded on both sides by corresponding wedge surfaces 34. The second axial bearing also consists of grooves 36 that are bounded by corresponding wedge surfaces 38.

In the embodiment according to FIGS. 1 to 4, five segments, each having one groove and two associated wedge surfaces, are provided for both the axial bearings as well as the radial bearing. Here, the grooves 32 and 36 of the axial bearings are disposed at the same angle as the grooves 28 of the radial bearing. The number of grooves for the radial bearing is also the same as that for the axial bearings.

Figure 7:
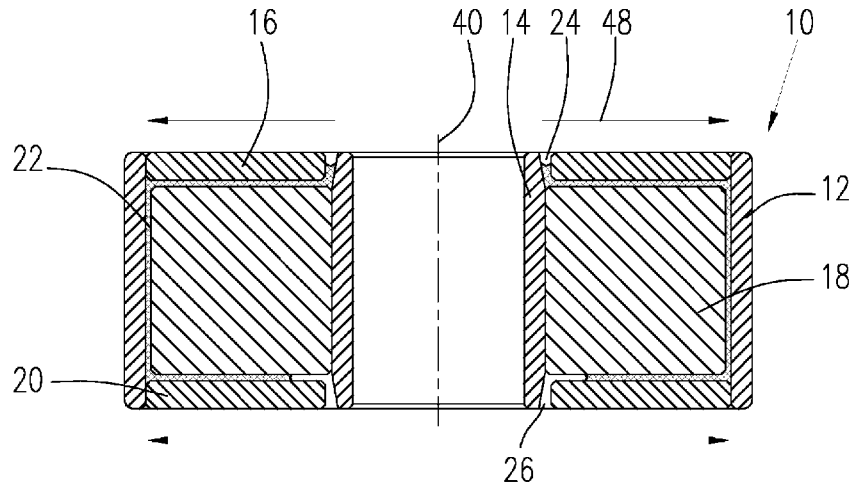
FIG. 7 shows again schematically a section through the bearing system according to FIGS. 1 to 4 and a possible distribution of the bearing fluid in the bearing gap.

FIG. 7 again shows a schematic section through the first embodiment of the bearing system 10, similar to the section of FIG. 1. Here, the bearing 10 and the distribution of the bearing fluid in the bearing gap when the bearing is in operation are illustrated. Depending on the manufacturing tolerances of the bearing parts, the column of fluid in the bearing gap 22 or in the adjoining sealing zones 24 and 26 respectively is established such that there is no longer any flow of fluid between the two open sides of the bearing, i.e. the column of fluid in the bearing gap 22 is stationary, as illustrated in FIG. 7. In the illustrated embodiment, the upper sealing zone 24 is partly filled with bearing fluid, whereas the lower sealing zone 26 and the beginning of the bearing gap 22 are free of bearing fluid. Through centrifugal forces, represented by arrow 48, the bearing fluid is pressed radially outwards back into the bearing gap 22, so that an equilibrium between the pumping effect of the bearing patterns and the centrifugal forces 48 is established.

Figure 5:
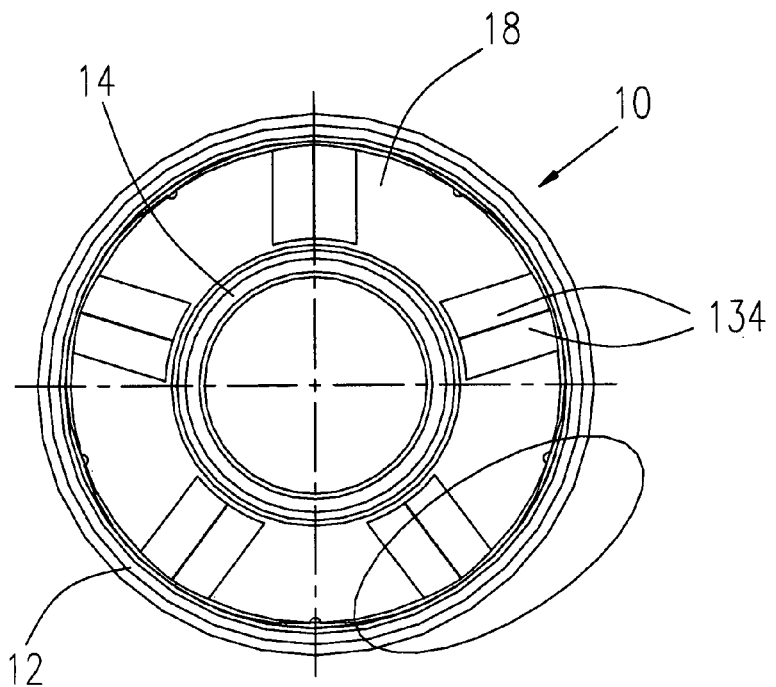
FIG. 5 shows a view from above of an embodiment of a bearing system according to the invention modified vis-à-vis FIGS. 1 to 4.
Figure 6:
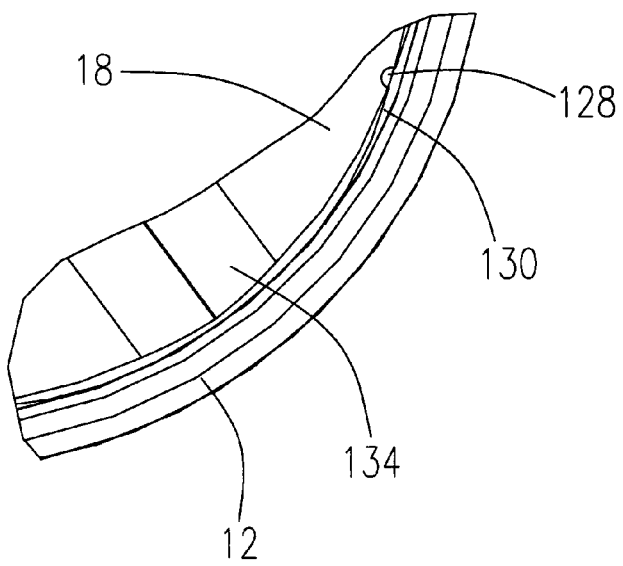
FIG. 6 shows an enlarged detail of the bearing system of FIG. 5.

FIGS. 5 and 6 show an embodiment of the bearing 10 modified with respect to FIGS. 1 to 4, particularly another embodiment of the design and arrangement of the bearing patterns. Here, identical components are indicated by the same reference numbers.

In contrast to the first embodiment, particularly FIG. 2, the segments of the axial bearings are characterized solely by adjoining wedge surfaces 134. There is no groove between the wedge surfaces 134 as was provided in FIG. 2. At their lowest point where they meet, the sloping surfaces may be made deeper than the sloping surfaces of FIG. 2, so as to ensure a sufficient flow of bearing fluid.

As can be seen from FIG. 6, the radial bearing again consists of grooves 128 that are bounded by lateral sloping surfaces 130. In contrast to the first embodiment, however, the grooves 128 of the radial bearing are offset with respect to the segment surfaces, particularly the wedge surfaces 134, of the axial bearings. This makes it possible to achieve, for example, a different or improved pumping effect on the bearing fluid and thus a uniform distribution of pressure in the bearing gap.

Figure 8:
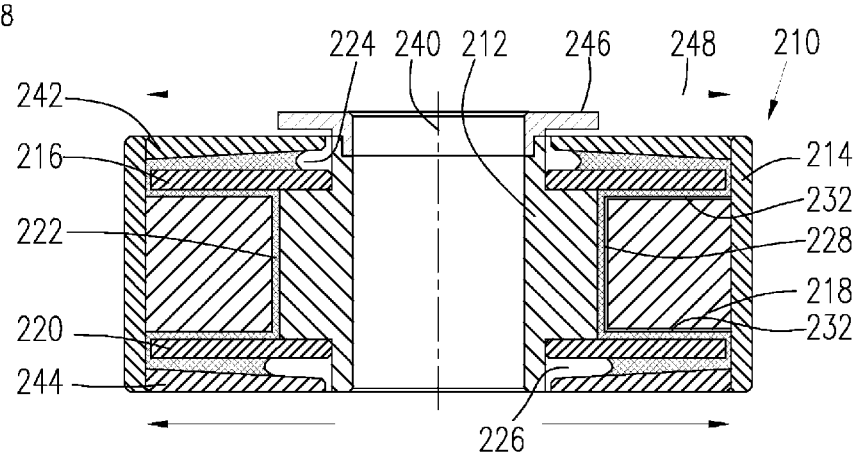
FIG. 8 shows a schematic section through a third embodiment of a bearing system according to the invention having radially extending sealing zones.

FIG. 8 shows a schematic section through a third embodiment of the bearing system 210 according to the invention. A first important difference to the previous embodiments is that the radial bearing now lies radially towards the inside, i.e. disposed on a smaller radius than the two axial bearings. Another difference is that the sealing zones no longer extend axially, but rather in a radial direction.

The bearing system 210 comprises a first bearing ring 212, which in this example takes the form of an inner ring of the bearing. Opposite this ring there is a second bearing ring 214 having a larger diameter that forms the outer ring of the bearing. The first bearing plate 216 and the third bearing plate 220 are fixed to the first bearing ring 212 at a spacing to one another and extend annularly radially towards the outside of the first bearing ring 212. An annular space is produced between the first bearing ring and the two bearing plates 216 and 220 in which a second bearing plate 218 is rotatably supported, the second bearing plate being connected to the second bearing ring 214. The ends of the bearing gap 222, which is formed between the bearing parts that are rotatable with respect to each other, are now disposed, in contrast to the previous embodiments, radially outwards in the region of the second bearing ring 214. Adjoining these ends of the bearing gap 222 are an upper sealing gap 224 and a lower sealing gap 226 that extend radially to the rotational axis 240 and whose openings are located at a smaller radial diameter than the smallest diameter of the bearing gap 222. The sealing gaps 224, 226 are bounded by the bearing plates 216 and 220 as well as corresponding cover plates 242 and 244 that are fixed to the second bearing ring 214 and extend approximately parallel to the bearing plates 216 and 220. The cover plates 242 and 244 may be slanted so as to produce tapered sealing regions 224 and 226 that widen in the direction of the open ends. The bearing gap 222 is fully filled with bearing fluid and the sealing zones 224 and 226 partly filled. The column of fluid in The column of fluid in the bearing gap 222 and the sealing zones 224, 226 is established according to the pumping effect of the axial bearings, characterized by grooves 232 on the end faces of the second bearing plate 218, and the radial bearing, characterized by grooves 228 distributed over the circumference of the second bearing plate 218, as well as the centrifugal force 248 acting on the bearing fluid. The advantage of the illustrated embodiment of the invention lies in the improved axial shock resistance compared to the first two embodiments, since the sealing zones 224 and 226 extend horizontally, i.e. at a right angle to the rotational axis 240. The open ends of the sealing zones 224 and/or 226 may additionally be covered by a covering cap 246.

Figure 9:
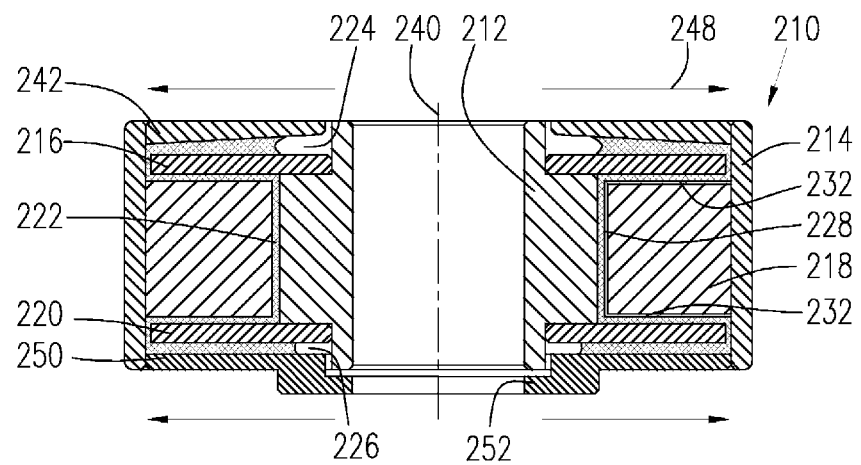
FIG. 9 shows a schematic section through a fourth embodiment of a bearing system according to the invention likewise having radially extending sealing zones.

FIG. 9 shows a modified variant of the bearing system according to FIG. 8, identical parts being given the same reference numbers. In contrast to FIG. 8, a fluid reservoir taking the form of a tapered capillary seal 224 is now shown in FIG. 9. The lower sealing gap 226 is designed as a straight gap seal that can be covered by a covering cap 252. Compared to the variant of FIG. 8, this variant has the advantage of a lower overall axial height and a lower bearing fluid evaporation rate since the lower sealing zone 226 has a much smaller opening surface to the environment than the upper sealing zone 224.

IDENTIFICATION REFERENCE LIST

10 Bearing system
12 First bearing ring
14 Second bearing ring
16 First bearing plate
18 Second bearing plate
20 Third bearing plate
22 Bearing gap
24 Sealing gap
26 Sealing gap
28 Groove (radial bearing)
30 Wedge surfaces (radial bearing)
32 Groove (axial bearings)
34 Wedge surfaces
36 Groove (axial bearings)
38 Wedge surfaces
40 Rotational axis
48 Centrifugal force
128 Groove (radial bearing)
130 Wedge surfaces (radial bearing)
134 Wedge surfaces (axial bearings)
210 Bearing system
212 First bearing ring
214 Second bearing ring
216 First bearing plate
218 Second bearing plate
220 Third bearing plate
222 Bearing gap
224 Sealing gap
226 Sealing gap
228 Groove, radial bearing
232 Groove, axial bearing
240 Rotational axis
242 Covering plate
244 Covering plate
246 Covering cap
248 Centrifugal force
250 Covering plate
252 Covering cap

The invention claimed is:

1. A fluid dynamic bearing system (10; 210) having a first bearing part and a second bearing part that is rotatable with respect to the first bearing part, both of which form a bearing gap (22; 222) filled with a bearing fluid between opposing bearing surfaces, the bearing gap having two open ends that are each sealed against the environment by means of sealing zones (24, 26; 224; 226), and bearing patterns used to generate hydrodynamic pressure within the bearing gap being provided on at least two spatially separated bearing surfaces, the first bearing part has a first bearing ring (12; 212) and a first and third bearing plate (16, 20; 216, 220) being disposed on the first bearing ring at a mutual spacing so that an annular space is formed between the first bearing ring (12; 212) and the first and third bearing plate, and that the second bearing part has a second bearing ring (14; 214) and a second bearing plate (18; 218) connected fixedly to the second bearing ring, the second bearing plate being accommodated in the annular space rotatable about a rotational axis (40; 240), the bearing gap (22; 222) extending between opposing surfaces of the bearing ring (12; 212), the first and third bearing plate (16, 20; 216, 220) and the second bearing plate, the bearing patterns used to generate hydrodynamic pressure being disposed on selected opposing bearing surfaces of the first bearing ring (12; 212), the first and third bearing plate or the second bearing plate, the bearing system comprising a segment step bearing that may be operated in both directions of rotation, the segment step bearing comprising two axial bearings that are formed by the radially extending bearing surfaces facing each other of the second bearing plate (18; 218) and of the first and third bearing plate (16, 20; 216, 220), and a radial bearing that is formed by the axially extending bearing surfaces facing each other of the second bearing plate (18; 218) and of the first bearing ring (12; 212), and the ends of the sealing zones (24, 26; 224; 226) open to the environment are disposed on a smaller radial diameter than the bearing gap, so that the bearing fluid is kept in the bearing gap by means of a centrifugal force.

2. A fluid dynamic bearing system according to claim 1, characterized in that the sealing zones (24, 26) are disposed adjoining the ends of the bearing gap (22) in an axial direction between opposing surfaces of the first and third bearing plate (16, 20) and of the second bearing ring (14).

3. A fluid dynamic bearing system according to claim 1, characterized in that the sealing zones (224; 226) are disposed at the ends of the bearing gap (222) in a radial direction between opposing surfaces of the first and third bearing plate (216, 220) and each of cover plates (242, 244) covering the first and third bearing plate.

4. A fluid dynamic bearing system according to claim 1, characterized in that the sealing zones (24, 26; 224; 226) take the form of capillary gap seals.

5. A fluid dynamic bearing system according to claim 1, characterized in that the sealing zones (24, 26; 224; 226) form a reservoir for the bearing fluid.

6. A fluid dynamic bearing system according to claim 1, characterized in that the open ends of the sealing zones (224; 226) are covered by a covering cap (246; 252).

7. A fluid dynamic bearing system according to claim 1, characterized in that the axial bearings have bearing patterns taking the form of a plurality of radially extending grooves (32, 36) in the end faces of the second bearing plate and wedge surfaces (34, 38) adjoining the grooves.

8. A fluid dynamic bearing system according to claim 1, characterized in that the radial bearing has bearing patterns taking the form of a plurality of axially extending grooves (28; 128) on the outside circumference of the second bearing plate (18; 218) and wedge surfaces (30; 130) adjoining the grooves.

9. A fluid dynamic bearing system according claim 8, characterized in that the number of grooves (28; 128) or wedge surfaces (30; 130) respectively of the radial bearing is different than the number of grooves (32, 36) or wedge surfaces (34, 38; 134) respectively of the axial bearings.

10. A fluid dynamic bearing system according to claim 9, characterized in that the grooves (28; 128) and wedge surfaces (30; 130) of the radial bearing are offset at an angle to the grooves (32, 36) and wedge surfaces (34, 38; 134) of the axial bearings.

11. A fluid dynamic bearing system according to claim 10, characterized in that the radial bearing is disposed radially inwards of the axial bearings.

12. A fluid dynamic bearing system according to claim 10, characterized in that the radial bearing is disposed radially outwards of the axial bearings.

13. A fluid dynamic bearing system according to claim 1, characterized in that the bearing system forms a part of an electric motor.

14. A fluid dynamic bearing system according to claim 1, characterized in that the axial bearings have bearing patterns taking the form of a plurality of radially extending wedge surfaces (134) in the end faces of the second bearing plate.

* * * * *